(12) United States Patent
Dey et al.

(10) Patent No.: US 9,710,539 B2
(45) Date of Patent: Jul. 18, 2017

(54) EMAIL ANALYTICS

(71) Applicant: TATA CONSULTANCY SERVICES LIMITED, Mumbai (IN)

(72) Inventors: Lipika Dey, Haryana (IN); Gautam Shroff, Haryana (IN); Somya Singh, Haryana (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 294 days.

(21) Appl. No.: 14/519,637

(22) Filed: Oct. 21, 2014

(65) Prior Publication Data
US 2015/0269242 A1  Sep. 24, 2015

(30) Foreign Application Priority Data
Mar. 20, 2014 (IN) .......................... 919/MUM/2014

(51) Int. Cl.
*G06F 17/30* (2006.01)
*H04L 12/58* (2006.01)

(52) U.S. Cl.
CPC ........ *G06F 17/30598* (2013.01); *H04L 51/00* (2013.01); *H04L 51/16* (2013.01); *H04L 51/34* (2013.01)

(58) Field of Classification Search
None
See application file for complete search history.

(56) References Cited

U.S. PATENT DOCUMENTS

| 7,412,483 | B2 * | 8/2008 | Kushmerick | ........ G06Q 10/107 709/203 |
|---|---|---|---|---|
| 8,140,540 | B2 * | 3/2012 | Chitiveli | ........... G06F 17/30707 707/748 |
| 8,291,024 | B1 | 10/2012 | Cheng et al. | |
| 8,438,225 | B2 * | 5/2013 | Serr | ....................... G06Q 10/00 709/204 |

(Continued)

FOREIGN PATENT DOCUMENTS

| CN | 101364955 | 2/2009 |
|---|---|---|
| WO | WO2013089646 | 6/2013 |

OTHER PUBLICATIONS

"Alto Mail", available as early as Oct. 13, 2014 and can be found at http://www.altomail.com/, 1 page.

(Continued)

*Primary Examiner* — Debbie Le
(74) *Attorney, Agent, or Firm* — Hamre, Schumann, Mueller & Larson, P.C.

(57) ABSTRACT

A method for performing email analytics is described. The method includes extracting emails from the configured email repository. The emails are then grouped into mail groups based on identification of content similarity of the emails. A network graph is then constructed for each of the mail group to identify an association of emails in the mail group based on header-level analysis of emails. Thereafter, email analytics is performed on the mail groups by clustering the mail groups into mail clusters based on temporal progression of emails in the mail groups. Key phrases are then determined based on a content analysis of emails in the mail groups in the mail clusters. The key phrases are then associated with the network graphs of the mail groups.

17 Claims, 6 Drawing Sheets

(56) References Cited

U.S. PATENT DOCUMENTS

| | | | | |
|---|---|---|---|---|
| 8,527,436 | B2* | 9/2013 | Salaka | G06Q 10/107 706/13 |
| 8,949,283 | B1* | 2/2015 | Cornwell | H04L 51/12 707/802 |
| 2005/0193002 | A1* | 9/2005 | Souders | G06Q 30/02 |
| 2007/0143298 | A1 | 6/2007 | Surendran et al. | |
| 2012/0054135 | A1* | 3/2012 | Salaka | G06Q 10/107 706/13 |
| 2013/0024443 | A1 | 1/2013 | Achuthan et al. | |
| 2014/0280619 | A1* | 9/2014 | Banatwala | H04L 51/36 709/206 |
| 2015/0142897 | A1* | 5/2015 | Alten | H04L 51/36 709/206 |
| 2015/0186494 | A1* | 7/2015 | Gilad | H04L 51/22 707/740 |

OTHER PUBLICATIONS

Harry Mylonadis, "The Geeks Guide to Dealing with Email Overload", Aug. 5, 2012, 38 pages, found at http://thenextweb.com/lifehacks/2012/08/05/the-geeks-guide-to-dealing-with-email-overload/ /.

Keim et al., "Mail explorer—Spatial and Temporal Exploration of Electronic Mail", IEEE VGTC Symposium on Visualization, 8 pages, Sep. 2005, Switzerland.

Johannes Mager, "Deep Email Miner", Philippe Vanpeperstraete, 2012, 4 pages, found at http://deepemailminer.sourceforge.net/.

"MetaSight", The Morphix Company Ltd., 2014, 2 pages, found at http://www.metasight.co.uk/.

Stolfo et al., "A Behavior-Based Approach to Securing Email Systems", Springer Berlin Heidelberg, vol. 2776 pp. 57-81, 2003.

"ToneCheck", Lymbix Inc., 2011, 1 page, found at http://tonecheck.com/.

Mukherjee et al., "Content Analysis based on Text Mining using Genetic Algorithm", Second International Conference on Computer Technology and Development (ICCTD), Nov. 2-4, 2010, 5 pages.

Wan et al., "Generating Overview Summaries of Ongoing Email Thread Discussions", the 20th International cl Conference on Computational Linguistics, Association for Computational Linguistics, Stroudsburg, PA, USA, Article 549, 7 pages, 2004.

Sahami et al., "A Bayesian Approach to Filtering Junk Email", AAAI Workshop on Learning for Text Categorization, Madison, Wisconsin, WS-98-05, Jul. 1998, 8 pages.

"Spamhaus", The Spamhaus Project, 1 page, 2014, found at http://www.spamhaus.org/.

"SpamCop", Cisco Systems, Inc., 1 page, 2013, found at http://www.spamcop.net/.

* cited by examiner

EMAIL ANALYTICS

TECHNICAL FIELD

The present subject matter relates, in general, to email analytics and, particularly but not exclusively, to performing email analytics for task management and performance analysis.

BACKGROUND

Emails today are the back-bone for an enterprise as the emails are used not only to communicate internally and externally, but also to collaborate on various projects and conduct business including marketing of products. These emails are repositories of data which can be analyzed to provide useful insights. Such analysis can be made for tracking email marketing efforts, detection of spam, tracking project status, and tracking personal email usage, such as response time and peek email activity. Presently, various tools are available to both enterprise and individuals for performing email analytics. These tools perform social network analysis, content analysis, and header-level analysis on emails to provide various insights, such as weekly volumes, top responders, response time, and other statistics include marketing statistics, such as number of mails opened and number of clicks in the opened mails.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The present subject matter relates to performing email analytics for task management and performance analysis.

Electronic mail or email has emerged as one of the most utilized mode of communications by individuals as well as enterprises. Emails are now accessible from multitude of sources including mobile computing devices, such as cell phones and laptops. Within enterprises or business organizations emails can be used for exchanging information about all organizational tasks related to planning, resource management, and project management in the enterprise. Emails can therefore serve as rich repositories of information that can provide valuable insights about enterprise functioning.

Emails exchanged between two or more users are typically stored in an email repository. A wide variety of intelligible information conventionally can be obtained through email analytics. Through email analytics and mining an email repository of an individual in the enterprise can provide useful information about status of different projects, and yield insights about probable causes of success or failure of the projects. Based on the analysis obtained, statistical reports are generated that can be used to increase efficiency, reduce problem resolution time, and assure quality and high customer satisfaction. As such, emails analytics find its application in various fields, such as sales and marketing, project management, and customer support.

Various conventional email clients provide a standard set of inbuilt functionalities, such as archival facility, folder-based organization, spam filtering, and email grouping to manage emails. However, these functionalities are mostly related to repository management tasks. Moreover, these functionalities are based on header-level analysis of emails. For example, the email grouping functionality can group multiple emails into one group based on same subject line. However, the email grouping functionality creates multiple groups of emails, which can have overlapping content, upon encountering different subject line. As such a lot of time is consumed while analyzing these multiple groups of emails having overlapping content.

Presently, various email analytical applications are available for mining email repositories and providing statistical data based on header-level analysis of emails. Examples of such statistical data include sender-receiver list, number of emails responded, number of emails opened, type of devices on which the emails were opened, and so on. Such type of statistical data is used for email management or tracking email marketing efforts. Also, based on the header-level analysis, the email analytical applications identify active social network among the various users who are exchanging the emails. Furthermore, some email analytics applications perform content analysis of emails for specific applications, such as inserting context-sensitive advertisements in emails and identifying emotions of senders and receivers. However, a combined analysis of content, network of users, and email exchange patterns is not performed to draw meaningful insights related to particular task.

Generally, the email analytics applications are largely based on analysis of header-level information of email, such as from- to addresses, subject line, send-receive time, and read/unread status of emails, and do not include content of emails along with the header-level information for analysis. Therefore, content of emails in conjunction with email exchange patterns is analyzed manually to gain information about various tasks, such as comparative status of different complaints, time taken for resolving the complaints, and identification of bottlenecks responsible for delay in resolution of complaints, for an entire chain of emails over a time. Thus, a lot of time and computing resources are consumed during manual intervention particularly when the number of emails is large.

The present subject matter relates to performing email analytics, in accordance with an implementation. In an implementation, the email analytics is performed on an email repository storing emails exchanged over a network. In one implementation, one or more emails are grouped based on content analysis of the emails in the email repository. In one implementation, the grouping of emails can be performed on emails stored in the email repository pertaining to one email client having one or more email accounts. In another implementation, the grouping of emails can be performed on emails stored in the email repositories pertaining to different email clients.

Emails can include either a single message or a message along with one or more trail mails that have overlapping content. For example, email A can include a message indicative of reporting a complaint, email B can include email A as a trail mail and a message indicating issuance of complaint number, and email C can include emails A & B as trail mails and a message indicating a solution for resolving the complaint. Thus, emails B & C have trail mails with overlapping contents. In an implementation, the content analysis is performed by detecting email level similarity and trail mail level similarity among the emails in the email repository for grouping the emails. In an implementation, an email level similarity between two emails is detected when the two emails have similar content and same or similar context. In one implementation, a trail mail level similarity is detected when two trail mails have overlapping content and same or similar context. The detection of trail mail level similarity enables detection and removal of duplicate emails and chains of emails duplicated across trail mails even if the emails are spaced far away in time. Therefore, the grouping of emails is performed only on non-duplicate emails.

Based on the detected similarity, the emails are grouped into multiple mail groups such that each mail group includes emails having similar content and context pertaining to a specific task or topic. Also, the grouping is performed such that two different mail groups have no overlapping of content and context. For example, emails in an email repository of complaint management system can be grouped into a plurality of mail groups such that each mail group pertains to a specific complaint. Further, each of the mail groups is associated with a unique mail group id and a history or a timeline which is defined based on a time-stamp associated with each of the emails within the mail groups. Thus, a single mail group is created for each task indicating a flow of information through emails over an entire time span, thereby providing a consolidated view of all emails related to the task even when a subject line of an email is changed.

Upon grouping the emails into mail groups, a network graph is determined for each of the mail groups based on a header-level analysis of the emails in the mail groups and content analysis of the trail mails present in the emails. The header level information of an email includes information, such as from- to addresses, subject line, send-receive time or time stamp of the email, email id, email client, read/unread status of the email, attachments in the email, importance associated with the emails, and category of the email. In one implementation, the header-level analysis involves identifying the header information of the email. Once the header-level analysis is complete, a network graph is constructed based on the identified header information of the emails within the mail groups.

The network graph determined from such header-level analysis includes a plurality of vertices connected by one or more directed edges. Each vertex in the network graph indicates a unique email. Each directed edge between a pair of vertices indicates an order of occurrence of the corresponding emails in the mail group. For example, a directed edge between a pair of vertices A and B, corresponding to emails A & B respectively, can indicate email A was sent or received after email B. In an implementation, the emails can be arranged in reverse chronological order of occurrence. In such implementation, recent most email is identified as an initial vertex and an email immediately preceding the recent most email is arranged as an adjacent vertex to the initial vertex. Subsequently, all emails are arranged in the order of their occurrence. Thereafter, directional edges are inserted between the arranged vertices to indicate the reverse chronological order of occurrence of the emails. Also, each constructed network graph is associated with an ordered timeline and a list of users based on the header-level analysis. Thus, the network graph identifies association of emails in each of the mail groups. Such network graphs provide a consolidated view about various tasks and related users, and forms basis for further analysis.

After determining the network graph for each of the mail groups, various analyses is performed on all the mail groups to gain insights from the mail groups. In an implementation the analysis includes temporal analysis and content analysis. The temporal analysis is performed on all the mail groups based on the associated timelines of the mail groups. In one implementation, the temporal analysis of the mail groups includes analyzing all the emails within each of the mail group over an entire time span of the mail group. The time span of the mail group can be defined as total time measured from an oldest email till a recent most email in the mail group. Such temporal analysis provides insights into how different tasks pertaining to each of the mail groups has temporally progressed over the entire span. For example, the temporal analysis of mail groups pertaining to different complaints in the compliant management system may provide insights, such as total time taken to resolve different complaints and number of emails which are unanswered.

In an implementation, the temporal analysis is performed by measuring activity-density for the mail groups over the entire time span of the mail groups. Activity density for the mail groups indicates number of emails exchanged between users per unit time. In an implementation, the activity-density is measured as number of email exchanged per day over the entire time span of the mail groups. For example, for the different mail groups pertaining to different complaints, activity-density can be measured as number of emails exchanged per day in each of the mail groups. Based on the measured activity-density of the mail groups, mail groups are clustered into mail clusters based on the temporal progression of the emails. Each such mail cluster may include one or more mail groups based on the activity density. For example, mail groups pertaining to different complaints may different time spans, such as one day, two days, one week, and one month. Based on the activity density, the mail groups are clustered as mail clusters of one day, two days, one week, and one month. In one implementation, the mail clusters may be plotted as activity density distribution graphs. Thus, the mail clusters enable identification of task attributes such as smoothness, skews, and deviations observed during the progression of task for efficient task management. For example, mail cluster of one day may indicate complaint resolved in one day, mail cluster of two day may indicate complaint resolved in two day, and so on.

Upon determining the mail clusters based on the temporal analysis of mail groups, content analysis is performed on the emails and trail mails within each of the mail groups in the mail clusters to extract linguistic and semantic information from the emails and trail mails. The linguistic and semantic information may include key phrases pertaining to named entities and user interaction information. The named entities may include names of experts and resources. The user interaction information may include phrases, such as updates, forwarded, deadline, issue, query, deactivation, reactivation, and so on, gathered from the content of emails and trail mails. Therefore, the key phrases may be used for determining type of activity and a state of activity pertaining to a mail group. For example, the key phrases may determine a reason for delay in resolving certain complaints like delay in receiving expert input. In an implementation, a combination of Natural Language Processing (NLP) techniques and statistical text processing techniques are used to extract linguistic and semantic information from the content of the emails and trail mails. The key phrases may then be associated with the network graph of each of the mail groups in the mail cluster. In an implementation, the key phrases may be associated using tag-clouds. The tag-clouds are visual representation of textual data based on an importance associated with the textual data. The tag-clouds are then superimposed on each of the network graphs of the mail group, thus enabling analysis of the content of emails at multiple granularity levels, such as email, trail mail, mail groups, and mail clusters.

Thereafter, the mail clusters and the extracted linguistic and semantic information may be further analysed to obtain task based insights related to performance of the task, status of the task, and identification of possible bottlenecks and their probable causes in finishing the task. Such insights may be provided in suitable report formats for task management and performance analysis. In one example of email repository pertaining to emails related to customer complaint support, the extracted linguistic and semantic information may indicate different types of complaints being received by a complaint resolution team, productivity of the complaint resolution team in terms of time spent on resolving different type of complaints, and bottlenecks causing delays in resolving complaints.

In another example of email repository pertaining to email communications among team-members working on a customer project can be analyzed to gain project-related insights. The extracted linguistic and semantic information from such email repository may provide identification of positive and negative feedback and their probable causes. Such information may then be used to obtain the project-related insights, such as causes for success or failure of a project or even gain early warnings about impending problematic issues.

Furthermore, the extracted linguistic and semantic information may be analyzed to obtain people insights. People insights may be used to identify experts of a subject matter, roles and responsibilities, and characteristics of individual users and groups. In an implementation, the people insights may be used in conjunction with the status reports for performance analysis.

Thus, the present subject matter enables a comprehensive analysis of emails using an amalgamation of various email analysis techniques, such as content analysis, network analysis, and temporal analysis to gain insights about individual users, tasks, and performances. Thus, manual intervention is eliminated and thereby reducing computation time and resources used for performing such email analysis. Also, such insights aid in decision making process through early detection of possible issues. Additionally, such insights enable identification of experts in relation to a particular subject.

Further, the comprehensive email analytics is initialized by grouping all emails including trail mails into mail groups based on content and header-level information. Such grouping of emails into mail groups eliminates the need to store duplicate emails present in trail mails and thereby reduce storage space. Also, the further analysis of emails is performed on clustering the mail groups into mail clusters based on temporal progression of the emails in the mail groups. Thereafter, imperative information is extracted from the mail clusters instead of analyzing each email individually. Thus, the computational time and resources are reduced and analysis results are provided at a faster rate.

These and other advantages of the present subject matter would be described in greater detail in conjunction with the following figures. While aspects of described systems and methods for performing email analytics can be implemented in any number of different computing systems, environments, and/or configurations, the embodiments are described in the context of the following device(s).

Figure 1A:
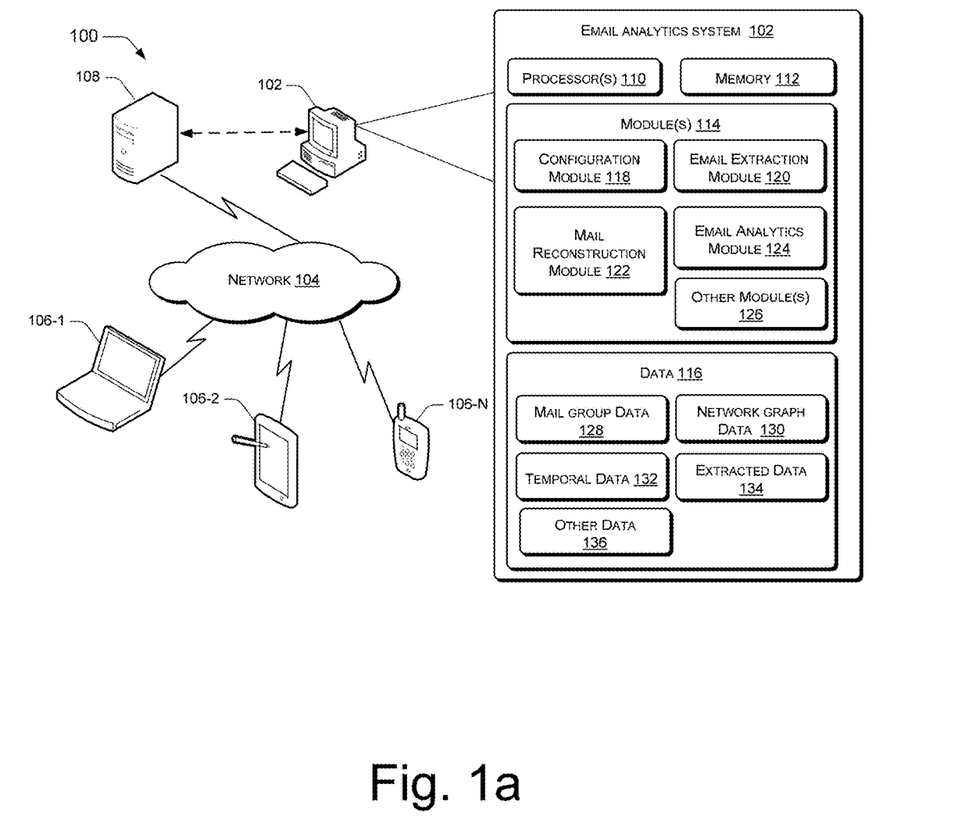
FIG. 1a illustrates email network environment implementing an email analytics system for performing email analytics, in accordance with an implementation of the present subject matter.

FIG. 1a illustrates email network environment 100 implementing an email analytics system 102 for performing email analytics on emails exchanged over a network 104, in accordance with an embodiment of the present subject matter. The network 104 can be a wireless or a wired network, or a combination thereof. Further, the network 104 can be a collection of individual networks, interconnected with each other and functioning as a single large network (e.g., the internet). Depending on the technology, the network 104 can include various network entities, such as gateways, routers; however, such details have been omitted for ease of understanding.

In an implementation, the network 104 can include a plurality of client devices 106-1, 106-2, . . . , 106-N, collectively referred to as client devices 106, individually referred to as client device 106, coupled to a mail server 108 for exchanging emails over the network 104. In an example, the client device 106 can include desktops, laptops, and tablet personal computers (PCs), mobile phones, and personal digital assistants (PDAs). Each client device 106 can include one or more email clients for sending and receiving emails over the network 104. Examples of such email clients include LOTUS NOTES®, OUTLOOK®, Gmail®, and Zimbra®. Also, the one or more email clients can be configured with one or more accounts for sending and receiving emails. Further, each of the client devices 106 can include one ore more email repository associated with the one or more email clients. Additionally, the mail server 108 can include plurality of email repositories pertaining to each of the client devices 106 associated with the one or more email clients.

For the purpose of performing email analytics for task management and performance analysis, the email analytics system 102 can be coupled to the mail server 108. The email analytics system 102 can be configured to perform email analytics on one of the email repositories in the mail server 108. In one implementation, the email analytics system 102 can be coupled to each of the client devices 106 and can be configured to perform email analytics on one of the email repositories in the client device 106.

In one implementation, the email analytics system 102 includes processor(s) 110 and memory 112. The processor(s) 110 can be implemented as one or more microprocessors, microcomputers, microcontrollers, digital signal processors, central processing units, state machines, logic circuitries, and/or any devices that manipulate signals, based on operational instructions. Among other capabilities, the processor(s) 110 is provided to fetch and execute computer-readable instructions stored in the memory 112. The memory 112 can be coupled to the processor(s) 110 and can include any computer-readable medium known in the art including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes.

Further, the email analytics system 102 can include module(s) 114 and data 116. The module(s) 114 and the data 116 can be coupled to the processor(s) 110. The module(s) 114, amongst other things, include routines, programs, objects, components, data structures, etc., which perform particular tasks or implement particular abstract data types. In addition, the module(s) 114 can be implemented as signal processor(s), state machine(s), logic circuitries, and/or any other device or component that manipulate signals based on operational instructions.

In an implementation, the module(s) 114 include a configuration module 118, email extraction module 120, mail reconstruction module 122, email analytics module 124, and other module(s) 126. The other module(s) 126 can include programs or coded instructions that supplement applications or functions performed by the email analytics system 102. Additionally, in said implementation, the data 116 includes mail group data 128, network graph data 130, temporal data 132, extracted data 134, and other data 136. The other data 136 amongst other things, can serve as a repository for storing data that is processed, received, or generated, as a result of the execution of one or more modules in the module(s) 114. Further, although the data 116 is shown internal to the email analytics system 102, it can be understood that the data 116 can reside in an external repository (not shown in the figure), which can be operably coupled to the email analytics system 102. Accordingly, the email analytics system 102 can be provided with interface(s) (not shown) to communicate with the external repository to obtain information from the data 116.

In operation, the email analytics system 102 performs email analytics on one of the email repositories stored in the mail server 108 configured by the configuration module 118. In one implementation, the email analytics system 102 can perform the email analytics on the configured email repository when the mail server 108 is in an offline mode, i.e., when the mail server 108 is not updating the email repository. Upon successful configuration of the email repository, the email extraction module 120 interacts with the mail server 108 to extract all emails from the configured email repository. The extracted emails can include either a single message or a message along with one or more trail mails in them that have overlapping content. For example, email A can include a message indicative of reporting a complaint, email B can include email A as a trail mail and a message indicating issuance of complaint number, and email C can include emails A & B as trail mails and a message indicating a solution for resolving the complaint. Thus, emails B & C have trail mails with overlapping contents.

The extracted emails are then analyzed by the mail reconstruction module 122 to group the extracted emails into mail group based on content analysis. The content analysis is performed to detect similarity in content of the extracted emails. In an implementation, detection of the content similarity includes detecting email level similarity and trail mail level similarity among the emails. An email level similarity between two emails is detected when the two emails have similar content and same or similar context. A trail mail level similarity is detected when two trail mails have overlapping content, same or similar context and identical history. The detection of trail mail level similarity enables detection and removal of duplicate emails and chains of emails duplicated across trail mails even if the emails are spaced far away in time.

Based on the detected content similarity, emails having similar content or overlapping content and same or similar context are grouped together into multiple mail groups. In an implementation, each of mail groups include emails having similar content and context pertaining to a specific task and each mail group is unique and different from other mail group. The mail groups are then associated with a timeline based on a time-stamp associated with the emails within each of the mail groups. Thus, each mail group includes all emails pertaining to a specific task for an entire time span of the task. For examples, emails in an email repository of complaint management system can be grouped into a plurality of mail groups such that each mail group pertains to a specific complaint and includes all emails exchanged between a user and complaint resolution team for the specific complaint.

Further, the mail reconstruction module 122 determines a network graph for each of the mail groups. Such a network graph identifies an association of emails in the mail groups for the entire timeline of the mail group. The association of emails in the mail group can include identification of an order of occurrence of the emails in the mail group. In an implementation, the network graph for each mail group is determined based on header-level analysis of the emails within the mail group. In such implementation, the header-level analysis of the emails include identifying header information of the emails, such as from- to addresses, subject line, send-receive time or time stamp, email id, email client, read/unread status, attachments, importance of the emails, and category of the emails. Based on the identified header information of the emails within the mail groups, the network graph is determined for each mail group. Also, each network graph is associated with an ordered timeline and a list of users based on the header-level analysis. Such network graphs provide a consolidated view about various tasks and related users, and forms basis for further analysis.

In an implementation, the network graph includes a plurality of vertices connected by one or more directed edges. Each vertex in the network graph indicates a unique email. Each directed edge between a pair of vertices indicates an order of occurrence of the corresponding emails. For example, a directed edge between a pair of vertices A and B, corresponding to emails A & B respectively, can indicate email A is sent or received after email B is sent or received. In an implementation, the emails can be arranged in reverse chronological order of occurrence. In such implementation, a recent most email is identified as an initial vertex and an email immediately preceding the recent most email is arranged as an adjacent vertex to the initial vertex. Subsequently, all emails are arranged in the order of their occurrence. Thereafter, directional edges are inserted between the arranged vertices to indicate the reverse chronological order of occurrence of the emails.

Upon determination of the network graphs, the email analytics module 124 performs various analysis on the emails in each of the mail groups and on whole set of groups to provide useful insights on task management and performance analysis. In an implementation, the email analytics module 124 performs temporal analysis and content analysis of the emails within each of the mail groups. In one implementation, the temporal analysis of the mail groups includes analyzing the emails within the mail groups over the entire time span of the mail groups. In one implementation, temporal analysis includes joint analysis of all mail groups to identify groups and sub-groups that exhibit similar behaviour. Such temporal analysis provides insights into how a specific task pertaining to the mail group has temporally progressed over the entire span. For example, the temporal analysis of a mail group pertaining to a specific complaint can provide insights, such as total time taken to resolve the complaint and how complaint was resolved.

In one implementation, the temporal analysis can be performed by measuring activity-density for the mail group over the entire time span of the mail group. The time span can be defined as time between an oldest mail of the mail group and a recent most email of the mail group. Activity density can be defined as number of emails exchanged per unit time. In an implementation, the activity-density is measured as number of emails exchanged per day over the entire time span of the mail group. Based on the measured activity-density of the mail groups, mail groups are clustered into mail clusters based on the temporal progression of the emails. Each such mail cluster may include one or more mail groups based on the activity density. For example, mail groups pertaining to different complaints may different time spans, such as one day, two days, one week, and one month. In one implementation, the mail clusters may be plotted as activity density distribution graphs and such activity density distribution graphs can be defined as temporal information.

Upon determining the mail clusters based on the temporal analysis of each mail group, the email analytics module 124 can perform the content analysis on the mail clusters. In one implementation, the content analysis is performed on the emails within each of the mail groups in each of the mail clusters to extract linguistic and semantic information from the emails. The extracted linguistic and semantic information can include key phrases, such as named entities and user interaction information. The user interaction information can include key phrases, such as updates, forwarded, deadline, issue, query, deactivation, reactivation, and so on, gathered from the content of emails and trail mails. The named entities can include names of sender and receiver, places, organizations, telephone numbers. Therefore, the key phrases may be used for determining type of activity and a state of the activity pertaining to a mail group. For example, the key phrases may determine a reason for delay in resolving certain complaints like delay in receiving expert input. In an implementation, a combination of Natural Language Processing (NLP) techniques and statistical text processing techniques are used to extract linguistic and semantic information from the content of the emails and trail mails.

Based on the extracted linguistic and semantic information, the email analytics module 124 associates the key phrases with the network graphs of the mail groups in the mail cluster. In an implementation, the key phrases are associated using tag-clouds. As would be understood, tag-clouds are visual representation of key phrases according to an importance associated with the key phrases. Thus, the key phrases enable analysis of the content of emails at multiple granularity levels, such as email, trail mails of the emails, mail groups, and mail clusters.

Upon performing the various analyses on the emails, the email analytics module 124 can categorize information obtained from the analysis and can analyse further to provide various insights related to performance of the task, status of the task, and identification of possible bottlenecks and their probable causes in finishing the task. Such insights can be provided in suitable report formats for task management and performance analysis. For example, the report can indicate different types of complaints being received by a complaint resolution team, productivity of the complaint resolution team in terms of time spent on resolving different type of complaints, and bottlenecks causing delays in resolving complaints. In one implementation, the email analytics module 124 can categorize the temporal information as project insights to monitor status of a task and to identify possible bottlenecks and their probable causes in finishing the task. In one implementation, the email analytics module 124 can categorize the extracted linguistic and semantic information as people insights to identify experts of a subject matter, roles and responsibilities as well as characteristics of individual users and groups.

Further, the temporal information, the linguistic and semantic information, the project insights, and the people insights can be stored in the memory of the email analytics system 102. In an implementation, such information can be stored as a mapping of various events, likely outcomes, and actions. For example, based on the temporal information and the linguistic and semantic information, a mapping of identified bottlenecks with user actions taken to clear bottlenecks and a mapping of user actions in response to different types of emails can be stored. Based on such information, task management can be performed by tracking the status of the task, predicting future course, and recommending experts as desired. In an implementation, based on similar analysis of another similar task, a likely outcome of the task can be predicted and actions can be taken. In an implementation, such information can also be stored in an external database coupled with the email analytics system 102. Such information can be periodically updated based on periodic email analysis of the emails.

Furthermore, the email analytics module 124 can interact with a user-interface module (not shown) to provide the analysis information and categorized insights to users through various charts and graph. The user interface module also enables user-interaction with the configured email repository and records all user-interactions in order to learn user preferences for personalization and customization purposes.

Figure 1B:
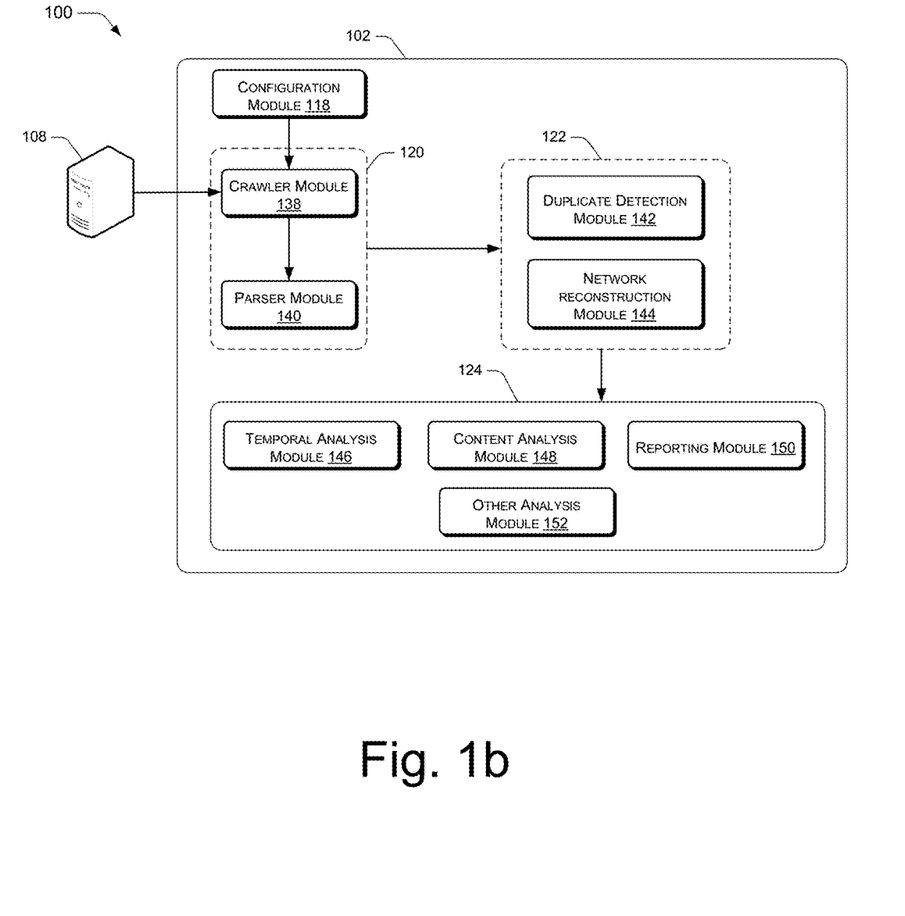
FIG. 1b illustrates a data and control flow of the email analytics system for performing email analytics, in accordance with an implementation of the present subject matter.

FIG. 1*b* illustrates a data and control flow of the email analytics system 102 for performing the email analytics. Since emails are nested entities such that each new email can contain one or many older emails, an implementation with the following indications is introduced for sake of explanation. It should be however noted that the present implementation is one amongst many other implementation, and should not be construed to limit the scope of the claimed subject matter:

Message (m)—A message is an atomic element that refers to a single email having a combination of a header (H) and a body (B) and no other older emails in trail.

Header (H)—Header includes basic information of an email extracted from the following fields including From, To, Cc, Bcc, Subject, Sent/Received Date & Time, Attachments, Importance, and Category of the email.

Body (B)—Body includes unstructured text in the email and excludes header information.

Trail mail (T)—A trail mail contains a header, a body and at least one more email in the trail. In other words, a trail mail can be referred to as a temporally arranged collection of two or more emails.

Email—An email can either include a single message or a message along with one or more tail mails.

Email repository—An email repository is a collection of emails and their trail mails. The $k^{th}$ trail mail in the email repository can be represented as:

$$(T_k):(m_{k1}, m_{k2}, \ldots, m_{ki}, m_{ki+1}, \ldots m_{kN})$$

where,
i: 1 to N;
$m_{ki}$: $H_{ki}+B_{ki}$; and
Sent/ReceivedDate&Time($m_{ki}$)>Sent/ReceivedDate&Time($m_{ki+1}$)

As mentioned previously, the configuration module 118 configures an email repository for performing email analytics. Upon configuration of the email repository, the email extraction module 120 interacts with the mail server 108 to extract emails from the configured email repository. For this purpose, the email extraction module 120 includes a crawler module 138 that interacts with the mail server 108 and extracts emails from the configured email repository. The email extraction module 120 also includes a parser module 140 for processing the extracted emails to identify trail mails and generates a mail collection. Accordingly, the parser module 140 identifies email components, such as header, body and signature to identify the trail mails embedded in trails of emails based on text based search techniques, such as regular expression search. In an implementation, the text based search techniques can be modified for identified email components for each email client. Upon identifying the trail mails, the parser module 140 generates a mail collection including emails along with their trail mails. Thereafter, the mail reconstruction module 122 analyzes the mail collection generated by the parser module 140.

For the purpose of analyzing the mail collection, the mail reconstruction module 122 includes a duplicate detection module 142 for analyzing and grouping the emails into mail groups based on content analysis. The content analysis of emails is performed to detect content similarity among the emails. The content similarity is performed to group the emails having similar content and same or similar context. The content similarity is detected at two levels of granularity, i.e., at email level and at trail mail level. Email level similarity is generally established when two emails have similar contents. Trail mail level similarity is established when two trail mails have substantially overlapping contents. For example, email A can include a message indicative of reporting a complaint, email B can include email A as a trail mail and a message indicating issuance of complaint number, and email C can include emails A & B as trail mails and a message indicating a solution for resolving the complaint. Thus, emails B & C have trail mails with overlapping contents.

Upon identification of similar emails and similar trail mails, the duplicate detection module 142 identifies duplicate emails and chains of similar emails duplicated across trail mails. In an implementation, the duplicate detection module 142 computes email level similarity based on a locality sensitive hashing (LSH) technique. In such implementation, an email is said to similar to another email if the computed email level similarity of component of emails, such as header and body between the two emails is greater than a predetermined threshold. The email level similarity between two emails $m_{pi}$ and $m_{qi}$ is computed as below:

$$m_{pi} \equiv m_{qj} \text{ if and only if } P[h_{min}(\overline{m}_{pi})$$
$$= h_{min}(\overline{m}_{qj})] > \alpha$$

where parameter $\alpha$ is the percentage similarity threshold. Given a hash function $h(\overline{m}_{pi}), h_{min}(\overline{m}_{pi})$ is the minimum hash value of message vector $\overline{m}_{pi} \underline{def} \text{ Concat}(\overline{Header}_{pi}, \overline{Body}_{pi})$ where $\overline{Header}_{pi}$ is the vector form of header ($H_{pi}$).

After computing the email level similarity between emails, the duplicate detection module 142 computes the trail mail level similarity between trail mails and categorizes the trail mails into three categories, namely, exact duplicates, complete containment, and partial overlap. In an implementation, two trail mails Ti and Tj are said to be exact duplicates of each other if all emails of Ti are similar to all the emails of Tj in same order of presence. This scenario typically occurs when multiple emails are sent by a sender. Upon detection of exact duplicates in trail mails, the duplicate detection module 142 preserves one of the trail mails and other trail mails are discarded. Therefore, storage space is increased by deleting all exact duplicate trail mails.

In another implementation, two trail mails Ti and Tj are categorized as complete containment if all emails of Ti are similar to some of the emails of Tj in same order of presence, but Tj contains one or more emails that are not present in Ti. This scenario is the most commonly occurring scenario. In one another implementation, two trail mails Ti and Tj are categorized as partial overlaps of each other if two trail mails Ti and Tj share some emails that appear in same order of presence in both Ti and Tj, but both Ti and Tj also have additional emails which are unique to each of them. This scenario typically occurs when communication branches out into two or more different groups of recipients or originates from multiple senders and converges to common set of receivers. Based on these categories and underlying conditions, the duplicate detection module 142 can achieve the trail mail level similarity.

In an implementation, the duplicate detection module 142 performs the following steps as illustrated below for detecting content similarity.

---

START
Given the mail-trail collection containing $\eta$ mail-trails: define, $M^{Repo} = \{T_k\}$, $k = 1 \ldots \eta$ where each mail-trail is represented by $T_k = [m_{k_n}]$, where $k_n$ denotes the number of messages contained in $T_k$.
1. FOR-EACH mail trail, $T_k$
Attach an index list $I_k = \{(p, q) \text{ where } p = k \text{ and } q = 1 \ldots k_n\}$.
2. Let S represent the bag of all messages obtained from the entire repository, with duplication allowed. Apply LSH on S to split it into groups of similar messages.
3. Let $C = \{C_1, C_2, \ldots, C_W\}$, where each element of C stores all positions of occurrence of similar messages within multiple trails. In other words, $C_j$ is given by:
$C_j = < (k_1, i_1), (k_2, i_2), \ldots, >$ which can be interpreted as follows: the same message or its near duplicates have been observed in $i_1$ position of trail $k_1$, $i_2$ position of trail $k_2$ and so on. $|C_j|$ denotes the number of instances of $C_j$.
END

---

As described above, the duplicate detection module 142 can take input of all emails and attach an index list to all trail mails in the emails. The index list includes an index of all trail mails present in the email such each trail mail is associated with corresponding email and position of each email is identified in trail mail is stored. Based on LSH technique, the duplicate detection module 142 can identify the similar emails and detect email level similarity. Upon identifying the similar emails, position of each email in the trail mails is identified from the index list. Based on the conditions of the categorization condition of trail mails, as described above, the duplicate detection module 142 can detect trail mail level similarity.

Upon identification of the email level similarity, the trail mail similarity, and deletion of exact duplicates among similar emails along with trail mails, the duplicate detection module 142 groups the similar emails into a plurality of mail groups such that each group includes a collection of emails having common trail mail and trail mails having common messages. In an implementation, the commonality within emails and trail mails can be defined as information related to a specific task. Further, such mail groups can be stored as mail group data 128 in the email analytics system 102. In an example, the duplicate detection module 142 can analyze an email repository of an enterprise handling customer complaints. In such example, the duplicate detection module 142 can analyze all the emails in the email repository and create mail groups pertaining to each complaint. The mail group for each complaint can include emails along with trail mails, such as initial reporting of complaint, issuing of a complaint tracking number, providing resolution to the complaint, receiving feedback on the complaint, closing the complaint, and so on.

After grouping the emails into different mail groups each pertaining to specific task, a network graph identifying an association of emails in the mail group is determined by the mail reconstruction module 122. For this purpose, the mail reconstruction module 122 includes a network reconstruction module 144 to determine the network graph for each of the mail groups from the mail group data 128. In an implementation, the network graph for a mail group can be represented as a linear graph having a plurality of vertices connected by one or more directional edges. Each vertex in the network graph represents a unique email and is organized in the network graph in order of their occurrence according to a time-stamp associated with the unique email. The directional edges in the network graph indicate an order of occurrence of the corresponding emails and represent a flow of communication between the emails. In an example, the emails are organized in a reverse chronological order.

In an implementation, the network graph is determined based on header-level analysis of the emails in the mail group. For determining the network graph, the network reconstruction module 144 identifies a recent most email as an initial vertex and arranges an email immediately following the recent most email as an adjacent vertex to the initial vertex. Subsequently, all emails are arranged in the order of their occurrence. Then, the network reconstruction module 144 then inserts the directional edges between the arranged vertices in order of their occurrence in the trail mails. In an implementation, a directional edge between a pair of two vertices indicates that the two corresponding unique emails have occurred in consecutive positions in at least one trail email. Similarly, when a trail mail is edited before sending, then multiple unidirectional edges are inserted between a pair of vertices. After inserting the directional edges, the network reconstruction module 144 removes duplicate edges from the network graph when complete containment or partial overlap scenarios are detected.

Based on these conditions, the network reconstruction module 144 can determine the network graphs for each mail groups. Such network graphs can be stored as network graph data 130 in the email analytics system 102. In an implementation, the network reconstruction module 144 constructs a network graph from a mail group as per the steps illustrated below.

```
START
1.   FOR-EACH mail trail T_a in M^{Repo} get index list I_a
FOR-EACH element (p, q) in I_a
Find the group C_j to which (p, q) belongs and replace (p, q) in I_a by the first
element of C_j as a part of de-duplication process
2.   Form an η × η mail-trail similarity matrix R = [R_{lk}], where R_{lk} =
Sim {T_l, T_k} computed as follows:
```

$$R_{lk} = \begin{cases} 1, & \frac{2*|I_l \cap I_k|}{\min(|I_l|, |I_k|)} > 1 \\ 0, & \text{otherwise} \end{cases}$$

```
3.   Initialize G = (V, E) = NULL. At the end of the reconstruction
process each unique message will have a representative vertex in V. An
edge
between a pair of vertices will indicate that the two corresponding mes-
sages
have occurred in consecutive positions in at least one trail.
4.   FOR-EACH row l of R,
   FOR-EACH k = 1, . . ., η
      IF R_{lk} = 1
         IF VISITED(T_k) = FALSE
            Mark VISITED(T_k) = TRUE
            For first element t_{k_1} if I_k create a node in V to represent t_k.
```

As described above, network reconstruction module 144 takes an input of mail group. A mail trail matrix is created by the network reconstruction module 144 by identifying positions of each email and each trail mail in an email. The mail trail matrix therefore identifies the order of occurrence of each email in trail mails. Based on the mail trail matrix, the network graph is created. Thus, the network graph identifies the association of each of emails in the mail group by identifying an order of occurrence of each of the emails in the mail group.

Figure 2A:
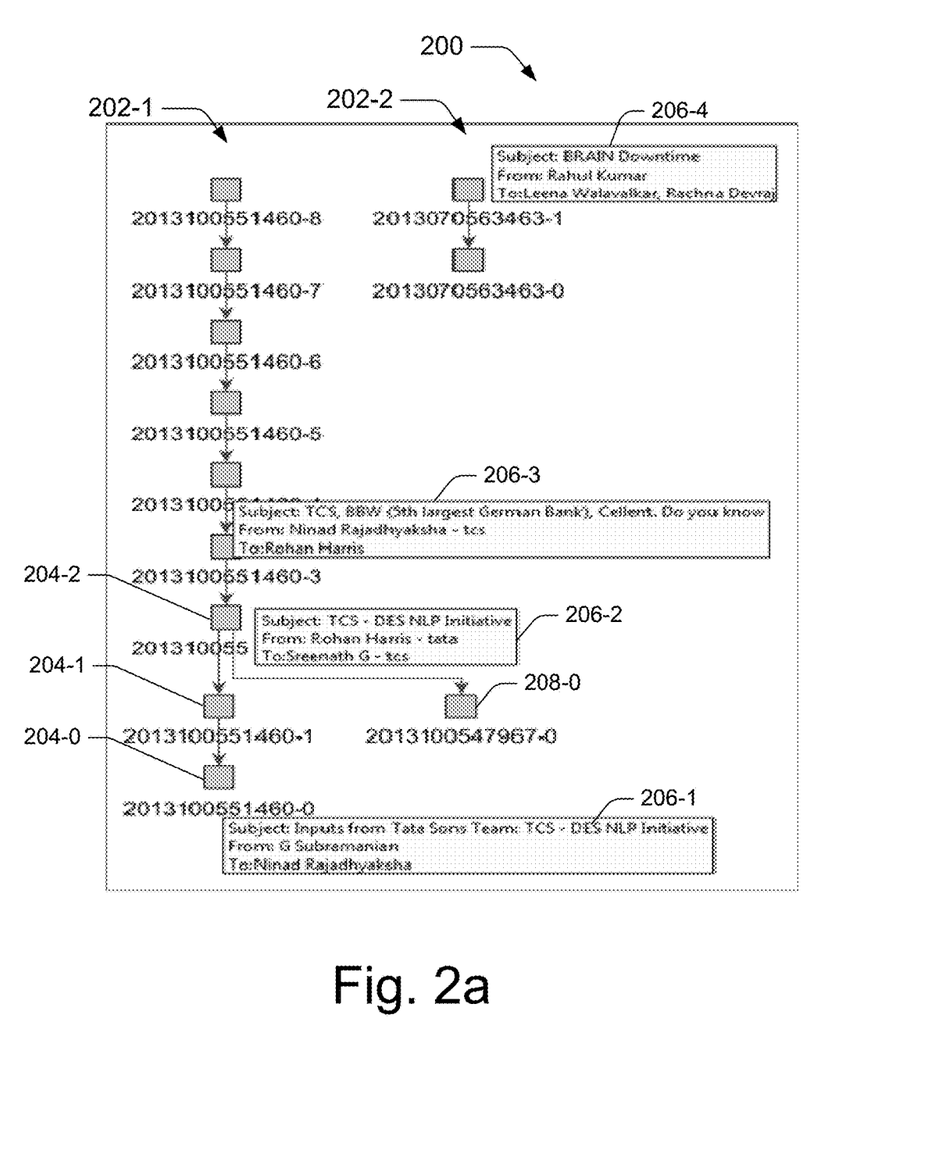
FIGS. 2a, 2b, and 2c illustrate an example email analytics results obtained by the email analytics system, in accordance with an implementation of the present subject matter.

FIG. 2a illustrates exemplary network graph 200 determined by the network reconstruction module 144. In the example, network graphs 202-1 and 202-2 obtained from two mail groups. In the network graph 202-1, vertex 204-0 represents an initial email of a project and vertex 204-8 represents a recent most email of the project. Text boxes 206-1, 206-2, 206-3, and 206-4 provide header-level information of emails, such as subject line and from and to email addresses. In the network graph 202-1, vertex 204-2 is connected with vertex 204-1 and 208-0. This indicates that emails and trail mails have been grouped together in the network graph based on users and overlapping content. Such network graph enables knowledge management, business intelligence, and better email search. Also, such network graph enables an easy view of entire history of emails including most recent email, initial email, total number of emails, number of users involved, and flow of communication and information.

After the determination of mail groups and corresponding network graphs, each mail group and collection of mail groups are further analyzed by the email analytics module 124. As each mail group includes content sharing a common history and an associated timeline based on the emails and trail mail within the mail group, the analysis of mail groups can provide insights into task management and performance analysis. In one implementation, the email analytics module 124 can include various modules, such as a temporal analysis module 146, a content analysis module 148, a reporting module 150, and other analysis module(s) 152 for performing various analyses on the mail groups. The other analysis module(s) 152 can perform other social network analysis, such as sentiment analysis, relationship analysis, and time series analysis. In an implementation, the functions of the temporal analysis module 146, the content analysis module 148, the reporting module 150, and the other analysis module(s) 152 can be performed by the email analytics module 124.

Accordingly, the temporal analysis module 146 performs temporal analysis to gain insights into how each of the tasks has temporally progressed. The temporal analysis is performed on each of the mail groups based on the associated timelines of the mail group to obtain mail clusters. The mail clusters may include one or more mail groups based on temporal progression of emails and trail mails. In one implementation, the temporal information is obtained by measuring activity-density for the mail group and plotting activity density distribution (ADD) over an entire time span of the mail group. The activity-density is measured as the number of email exchanged per unit time. Similarly, a time span of the mail group denotes total time a trail mail has been active within an email repository and is computed as a time difference between most recent email and oldest email in the mail group. Based on the ADD, the mail clusters are obtained and can be stored as temporal data 132 in the email analytics system 102.

In one implementation, to compute ADD, the time span of the mail group is normalized to a representative time-period between 0 and 1. The normalized time span is further discretized into a fixed number of time-intervals, referred to as bins (B). For each associated timeline of the mail group, a normalized ADD is re-constructed using re-sampling with respect to the new defined time-intervals. Further, activity values are normalized such that activity density values sum up to unity for each mail group. A normalized ADD is represented through the following equation:

$$\text{Normalized } ADD = \{a_1, \ldots, a_B\}$$

$$\text{such that } \sum_{k=1}^{B} a_k = 1 \text{ and } B \text{ is a power of 2}$$

The normalized ADD is then further analyzed by the temporal analysis module 146 based on spectral techniques. In one implementation, Fourier Transform technique is used to obtain a spectrum of each normalized ADD such that each ADD after applying the Fourier Transform can be mathematically represented as:

$$ADD_{Spect} = \{sa_1, \ldots, sa_B\} = FFT[ADD] = \left\{ \sum_{n=1}^{B} a_n e^{-j2\pi(k-1)(n-1)/B} \right\},$$

$$k = 1 \text{ to } B$$

Such spectrum can be viewed as a vector of complex quantities, where the real and the imaginary parts represent the magnitude and phase respectively. Mathematically, each component of $ADD_{Spect}$, $sa_i$ is given by $sa_i^R = jsa_i^I$.

Further, the timelines of the mail group transformed into spectral forms are now grouped using k-means algorithm with a re-defined distance measure that can handle complex-valued features. The distance measure between two complex-valued feature vectors $ADD_{spect-1} = \{sa_{11}, \ldots sa_{1B}\}$ and $ADD_{spect-2} = \{sa_{21}, \ldots, sa_{2B}\}$ used is as follows:

$$d(ADD_{Spect-1}, ADD_{Spect-2}) = \sqrt{\sum_{n=1}^{B} \|sa_{1n} - sa_{2n}\|_2^2}$$

Figure 2B:
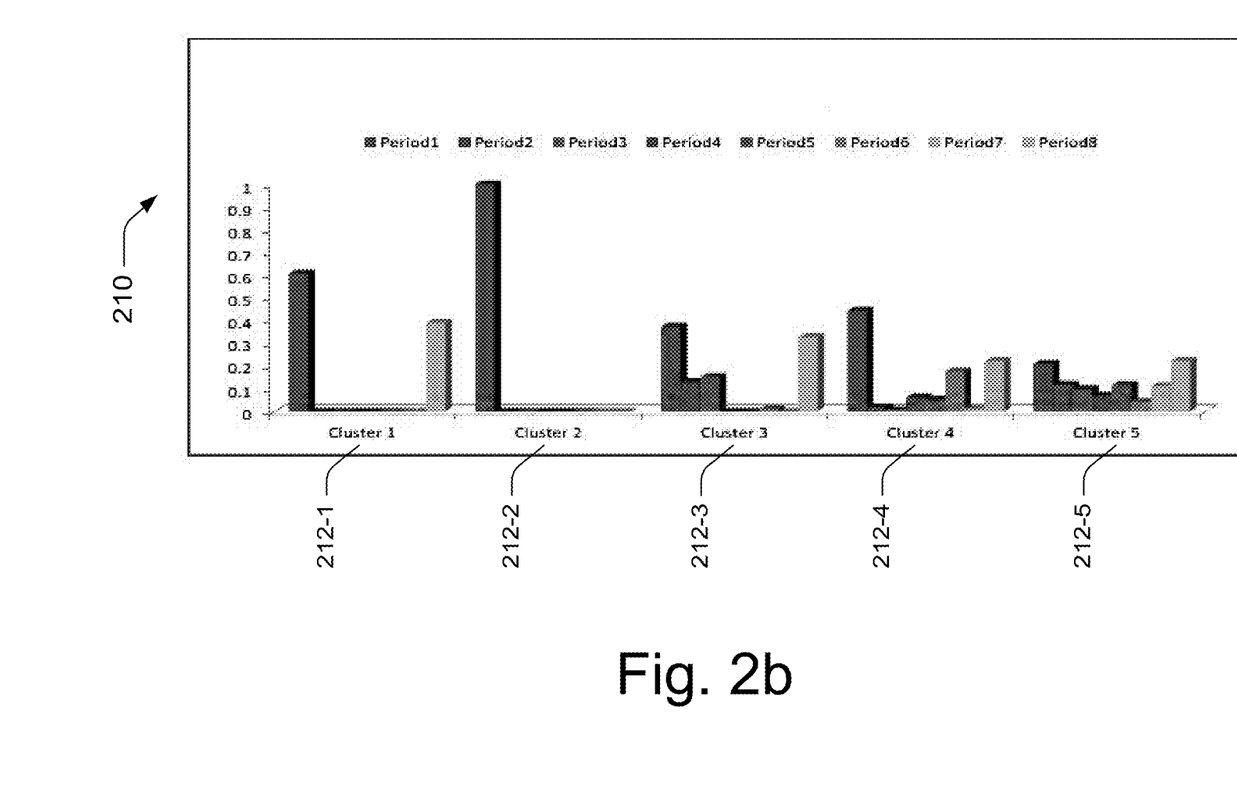

FIG. 2b illustrates an ADD 210 computed for different mail groups as 5 distinct mail clusters namely, 212-1 as cluster 1, 212-2 as cluster 2, 212-3 as cluster 3, 212-4 as cluster 4, and 212-5 as cluster 5. The number of email is provided on the vertical axis and the time period in days is provided on the horizontal axis. A visual analysis of the computed ADD 210 indicates that cluster 212-2 includes complaints having single instance of email implying speediest resolution as there are no follow-up emails. Cluster 212-1 shows a group which show slightly more activity spread over two distinct time-intervals—the start and the end. Clusters 212-3 to 212-5 are denser in terms of activity over the time span. Further, even-though the computed ADD 210 is nearly same for cluster 212-3 and cluster 212-4, the time-interval of dense activity is skewed towards left-end in the cluster 212-3 and towards right-end in the cluster 212-4. Thus, from the ADD of clusters 212-2 to 212-5 in FIG. 2b, it can be observed that there are delays in providing resolution to specific type of complaints, where as some specific type of complaint are resolved quickly. Also, it can be observed that the specific type of complaints involving an expert help for providing a resolution and as such the resolution time increased. As can be gathered, the temporal information identifies task attributes, such as smoothness, skews, and deviations observed during the progression of a specific task for efficient task management.

After performing temporal analysis, the email analytics module 124 performs further content analysis on the emails in each of the mail clusters to extract linguistic and semantic information. The linguistic and semantic information can include key phrases, such as named entities and user interaction information. The named entities may include experts in a particular subject, and user interaction information may include imperative phrases, such as names of tools and technologies, updates, forwarded, deadline, issue, query, deactivation, reactivation, and so on. For this purpose, the content analysis module 148 extracts the linguistic and semantic information from the mail cluster based on text analytics techniques. In an implementation, the text analysis techniques can include a combination of Natural Language Processing techniques, such as Named Entity Recognition and Phrase Extraction, and any statistical method. Further, the extracted linguistic and semantic information can be stored as the extracted data 134 in the email analytics system 102.

Upon extraction of the linguistic and semantic information from the mail cluster, the extracted linguistic and semantic information is associated with a corresponding network graph of the mail groups within the mail cluster as the mail groups may have similar context. In an implementation, the content analysis module 148 can obtain the corresponding network graph from the network graph data 130. The association of the extracted linguistic and semantic information with the network graph enables visual analysis of the content of mail group at multiple levels of granularity, such as emails, trail mails, mail groups, and mail clusters. In an implementation, the extracted linguistic and semantic information is associated with the network graph as tag-clouds using Part of Speech Tagging (POST) technique. As would be understood, the tag-clouds are visual representation of textual data based on an importance associated with the textual data. The association of such tag-clouds to the mail groups enables drawings of insights about the type of information being exchanged in the mail group.

Figure 2C:
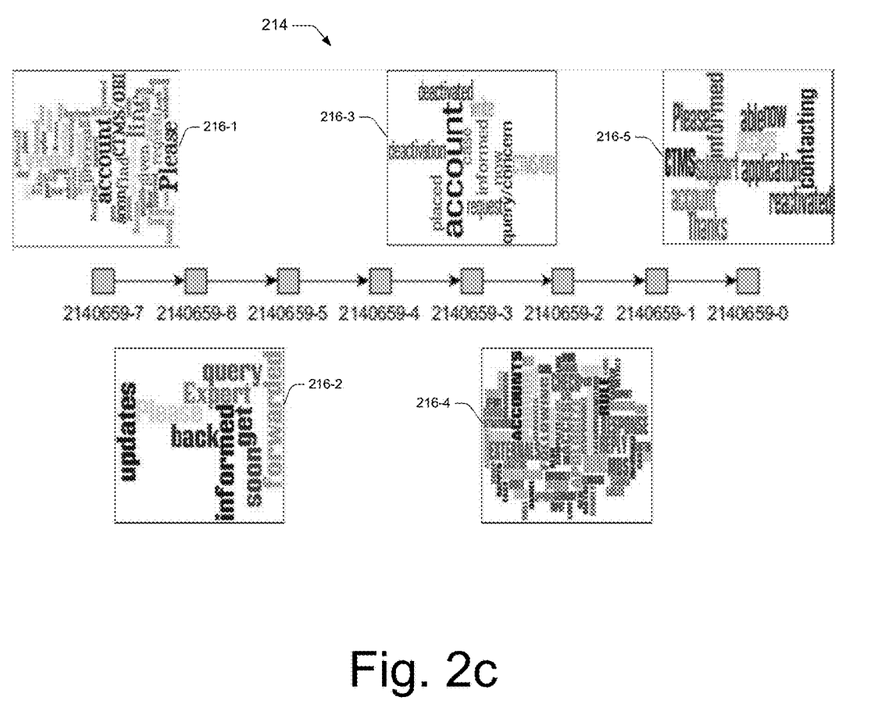

FIG. 2c illustrates a network graph associated with tag-clouds 214 for a mail-group pertaining to cluster 212-4, mentioned in FIG. 2b. It can be observed from tag-clouds 216-1, 216-2, and 216-3 that a complaint related to providing access had to be escalated to an expert during the subsequent time intervals. Further, it can be observed from tag-cloud 216-4 that expected expert reply was received during late mid-interval of the time span and from tag-cloud 216-5 that the complaint was finally resolved by de-activating and re-activating user-account.

Further, based on the temporal information and the extracted key phrases obtained from the temporal analysis and the content analysis, respectively, the email analytics module 124 can further be analysed and provided statistical reports which can be used in decision making process. Accordingly, the reporting module 150 categorizes the temporal information obtained through the temporal analysis and the key phrases extracted through content analysis, into project insights and people insights.

In one implementation, the project insights or task related insight provide statistical information related to status of task so as to identify bottlenecks and their causes. In an example, a task insight report can provide statistical information about number of complaints resolved, number of days elapsed in resolving the complaints, number of complaints resolved by intervention of experts, and so on. In another example, a project insight report can provide information about positive or negative feedback about a project and probable causes of the feedback. Further, upon analyzing the project insights of a particular task, a likely output of the particular task can be predicted based on similar analysis of other tasks. Based on the predicted likely outcome, task management can be performed.

In another implementation, the people insights provide statistical information related to persons involved in the task to identify expertise, roles and responsibilities of people involved, and actions taken upon encountering an issue. In an example, a people insight report can provide statistical information about experts referred for resolving a complaint, resolutions provided for complaints, and so on.

Further, the temporal information, key phrases, project insights, and people insights can be stored in the memory 112 of the email analytics system 102. In an implementation, such information can be stored as a mapping of various events, likely outcomes, and actions. For example, based on the temporal information and the linguistic and semantic information, a mapping of identified bottlenecks with user actions taken to clear bottlenecks and a mapping of user actions in response to different types of emails can be stored. Such information can be periodically updated based on the email analytics performed at periodic intervals. In an implementation, such information can also be stored in a database (not shown) coupled with the email analytics system for efficient task management and performance analysis. Thus, the email analytics system 102 performs a comprehensive email analysis using a combination of various analysis techniques.

Figure 3:
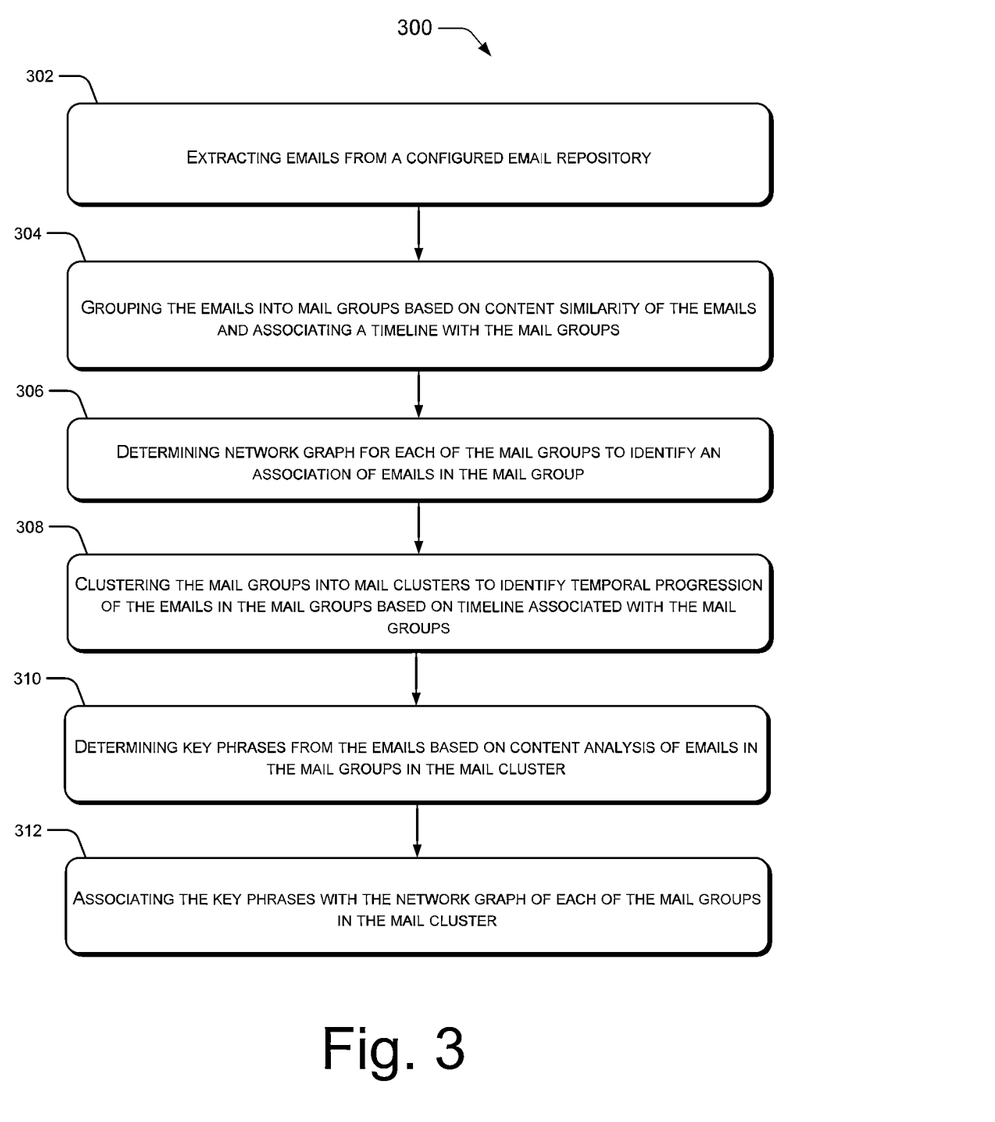
FIG. 3 illustrates a method for performing email analytics, in accordance with an implementation of the present subject matter.

FIG. 3 illustrates a method 300 for email analytics for task management and performance analysis according to an embodiment of the present subject matter. The order in which the method is described is not intended to be construed as a limitation, and any number of the described method blocks can be combined in any order to implement the method or any alternative method. Additionally, individual blocks can be deleted from the method without departing from the spirit and scope of the subject matter described herein. Furthermore, the method can be implemented in any suitable hardware, software, firmware, or combination thereof The method can be described in the general context of computer executable instructions. Generally, computer executable instructions can include routines, programs, objects, components, data structures, procedures, modules, functions, etc., that perform particular functions or implement particular abstract data types. The method can also be practiced in a distributed computing environment where functions are performed by remote processing devices that are linked through a communications network. In a distributed computing environment, computer executable instructions can be located in both local and remote computer storage media, including memory storage devices.

In an implementation, one or more of the methods described herein can be implemented at least in part as instructions embodied in a non-transitory computer-readable medium and executable by one or more computing devices. In general, a processor, for example a microprocessor, receives instructions, from a non-transitory computer-readable medium, for example, a memory, and executes those instructions, thereby performing one or more methods, including one or more of the methods described herein. Such instructions can be stored and/or transmitted using any of a variety of known computer-readable media.

With reference to the description of FIG. 3, for the sake of brevity, the details of the components of the email analytics system 102 are not discussed here. Such details can be understood as provided in the description provided with reference to FIG. 1a and FIG. 1b.

Referring to FIG. 3, at block 302, an email repository is configured for performing email analytics and emails are extracted from the configured email repository. In an implementation, text based search techniques, such as regular expression search are used for searching email components like the headers, body and signature to identify emails.

At block 304, the emails are analyzed to group the emails into mail groups based on content similarity of the emails. Each such mail group is associated with a timeline based on time-stamps associated with the emails within the mail group. In an implementation, the content similarity is performed to group the emails having same context and similar content in their body. The content similarity includes computing email level similarity and trail mail level similarity.

At block 306, a network graph is determined for each of the mail groups to identify an association of emails in the mail group. In an implementation, the network graph is determined based on header level analysis and content analysis of the emails and trail mails in the mail groups.

At block 308, the mail groups are clustered into mail clusters based on the timeline associated with the mail groups. The mail clusters may include one or more mail groups. The mail clusters provide temporal information identifying the temporal progression of emails in the mail groups based on the timeline associated with the mail groups. In an implementation, the temporal information is obtained by measuring activity density distribution of the mail group.

At block 310, key phrases are determined from the emails and trail mails in each of the mail clusters by performing content analysis of the emails and trail mails in each of the mail clusters. The key-phrases are indicative of project insights and people insights.

At block 312, the determined key phrases are then associated with the network graph of each of the mail groups in the mail cluster.

Although implementations for methods and systems for performing email analytics are described, it is to be understood that the present subject matter is not necessarily limited to the specific features or methods described. Rather, the specific features and methods are disclosed as implementations for performing email analytics.

We claim:

1. A computer implemented method for performing email analytics on a configured email repository, the computer implemented method comprising:

grouping, by a processor, emails in the configured email repository, into a plurality of mail groups based on identifying similarity of content in the emails, wherein each of the plurality mail groups is associated with a timeline;

determining, by the processor, a network graph for each of the plurality of mail groups based on a header information of emails within each of the plurality of mail groups, wherein the network graph indicates an association of the emails in the plurality of mail groups; and performing, by the processor, email analytics on the plurality of mail groups, wherein the performing includes:

clustering, by the processor, the plurality of mail groups into a plurality of mail clusters based on a temporal analysis of the emails within each of the email groups, wherein the temporal analysis identifies a temporal progression of the emails over the timeline of each of the plurality of mail groups by computing activity density distribution of each of the plurality of mail groups, and wherein the plurality of mail clusters are plotted as activity density distribution graphs;

determining, by the processor, key phrases from content of emails in the plurality of mail groups in each of the plurality of mail clusters; and associating, by the processor, the key phrases with the network graph of each of plurality of mail groups, wherein the key phrases are indicative of type of activity and state of activity in each of the plurality of mail groups.

2. The computer implemented method as claimed in claim 1, wherein the key phrases are associated with the network graph by the processor using tag-clouds identifying the key phrases in accordance with a predetermined importance.

3. The computer implemented method as claimed in claim 1, wherein the determination of the key phrases, by the processor, is based on a content analysis of the emails within the plurality of mail groups in each of the mail clusters and wherein the key phrases include named entities and user interaction information.

4. The computer implemented method as claimed in claim 1 further comprising extracting, by the processor, emails from the configured email repository for grouping the emails into the plurality of mail groups.

5. The computer implemented method as claimed in claim 1, wherein the determination of the network graph for each of the plurality of mail groups by the processor is further based on analysis of the header information of emails within each of the plurality of mail groups.

6. The computer implemented method as claimed in claim 1, wherein the network graph identifies the association of emails in the mail group based on an order of occurrence of the emails in the mail group.

7. The computer implemented method as claimed in claim 1, wherein the grouping of email into the plurality of mail groups by the processor further comprises identifying overlapping content in the emails based on email level similarity in the emails and trail mail level similarity in trail mails of the emails in each of the plurality of mail groups.

8. An email analytics system for performing email analytics on a configured email repository, the email analytics system comprising:

a processor;

a mail reconstruction module coupled to the processor to:
group emails in the configured email repository into a plurality of mail groups based on identifying similarity of content in the emails, wherein each of the plurality mail groups is associated with a timeline; and determine a network graph for each of the plurality of mail groups based on a header information of emails within each of the plurality of mail groups, wherein the network graph indicates an association of emails in the plurality of mail groups; and an email analytics module coupled to the processor to perform email analytics on the plurality of mail groups, wherein the email analytics module performs the following:

cluster the plurality of mail groups into a plurality of mail clusters based on a temporal analysis of the emails within each of the email groups wherein the temporal analysis identifies a temporal progression of the emails over the timeline of each of the plurality of mail groups by computing activity density distribution of each of the plurality of mail groups and wherein the plurality of mail clusters are plotted as activity density distribution graphs;

determine key phrases from content of emails in the plurality of mail groups in each of the plurality of mail clusters; and associate the key phrases with the network graph of each of plurality of mail groups, wherein the key phrases are indicative of type of activity and state of activity of each of the plurality of mail groups.

9. The email analytics system as claimed in claim 8, wherein the email analytics module further comprises a content analysis module to:

determine key phrases from content of emails in the plurality of mail groups in each of the plurality of mail clusters based on a content analysis of each of the mail clusters, wherein the key phrases include named entities and user interaction information; and associate key phrases with the network graph using tag-clouds, wherein the tag-clouds indicate the key phrases in accordance with an associated importance.

10. The email analytics system as claimed in claim 8, wherein an email extraction module is coupled to the processor to extract emails from the configured email repository for grouping the emails into the plurality of mail groups.

11. The email analytics system as claimed in claim 8, wherein the mail reconstruction module includes a network reconstruction module for determining the network graph for each of the plurality of mail groups to identify an order of occurrence of the emails in each of the plurality of mail groups.

12. The email analytics system as claimed in claim 8, wherein the mail reconstruction module further comprises a duplicate detection module to identify similarity of content similarity based on overlapping content in the emails, the identification including identifying email level similarity in the emails and trail mail level similarity in trail mails of the emails in the plurality of mail groups.

13. The email analytics system as claimed in claim 8, wherein the mail reconstruction module is further configured to determine the network graph for each of the plurality of mail groups based on analysis of the header information of emails within each of the plurality of mail groups.

14. The email analytics system as claimed in claim 13, wherein the network graph identifies the association of emails in the mail group based on an order of occurrence of the emails in the mail group.

15. The email analytics system as claimed in claim 8, wherein the email analytics module is further configured to determine the key phrases based on a content analysis of the emails within the plurality of mail groups in each of the mail cluster, and wherein the key phrases include named entities and user interaction information.

16. A non-transitory computer-readable medium comprising instructions executable by a email analytics system to:
- group emails in a configured email repository, into a plurality of mail groups based on identifying similarity of content in the emails, wherein each of the plurality mail groups is associated with a timeline;
- determine a network graph for each of the plurality of mail groups based on a header information of emails within each of the plurality of mail groups, wherein the network graph indicates an association of emails in the mail group; and
- perform email analytics on the plurality of mail groups, wherein the performing includes:

cluster the plurality of mail groups into a plurality of mail clusters based on a temporal analysis of the emails within each of the email groups, wherein the temporal analysis identifies a temporal progression of the emails over the timeline of each of the plurality of mail groups by computing activity density distribution of each of the plurality of mail groups, and wherein the plurality of mail clusters are plotted as activity density distribution graphs;
- determine key phrases from content of emails in the plurality of mail groups in each of the plurality of mail clusters based on a content analysis of the emails within the plurality of mail groups in each of the mail clusters, wherein the key phrases include named entities and user interaction information; and
- associate the key phrases with the network graph of each of plurality of mail groups, wherein the key phrases are indicative of type of activity and state of activity in each of the plurality of mail groups.

17. The non-transitory computer-readable medium as claimed in claim 16, wherein the non-transitory computer-readable medium further comprises instructions executable by the email analytics system to identify similarity of content similarity based on overlapping content in the emails, the identification including identifying email level similarity in the emails and trail mail level similarity in trail mails of the emails in the plurality of mail groups.

* * * * *